United States Patent
Leis et al.

(10) Patent No.: US 7,803,345 B2
(45) Date of Patent: Sep. 28, 2010

(54) METHOD OF MAKING THE POROUS CARBON MATERIAL OF DIFFERENT PORE SIZES AND POROUS CARBON MATERIALS PRODUCED BY THE METHOD

(75) Inventors: Jaan Leis, Tartu (EE); Mati Arulepp, Tartu (EE); Marko Lätt, Tartu (EE); Helle Kuura, Tartu (EE)

(73) Assignee: HLR Development OU, Tartu (EE)

( * ) Notice: Subject to any disclaimer, the term of this patent is extended or adjusted under 35 U.S.C. 154(b) by 836 days.

(21) Appl. No.: 11/628,153

(22) PCT Filed: May 31, 2005

(86) PCT No.: PCT/EE2005/000007

§ 371 (c)(1),
(2), (4) Date: Nov. 30, 2006

(87) PCT Pub. No.: WO2005/118471

PCT Pub. Date: Dec. 15, 2005

(65) Prior Publication Data

US 2009/0117094 A1    May 7, 2009

(30) Foreign Application Priority Data

Jun. 1, 2004   (EE) ................ 200400091
Apr. 18, 2005  (EE) ................ 200500009

(51) Int. Cl.
*B32B 5/16* (2006.01)
*C01B 31/02* (2006.01)

(52) U.S. Cl. .............. 423/445 R; 428/212; 428/220; 428/310.5

(58) Field of Classification Search ........... 428/212, 428/220, 304.4, 310.5, 402; 423/445 R
See application file for complete search history.

(56) References Cited

U.S. PATENT DOCUMENTS

| | | | | |
|---|---|---|---|---|
| 4,205,055 A | * | 5/1980 | Maire et al. | 423/445 R |
| 4,536,358 A | * | 8/1985 | Welsh et al. | 264/81 |
| 5,614,459 A | * | 3/1997 | Mondragon et al. | 502/417 |
| 5,876,787 A | * | 3/1999 | Avarbz et al. | 427/79 |
| 5,965,483 A | | 10/1999 | Baker et al. | |

(Continued)

FOREIGN PATENT DOCUMENTS

GB       971943       10/1964

(Continued)

OTHER PUBLICATIONS

Leis et al., Carbon, 39 (2001), pp. 2043-2048.

(Continued)

*Primary Examiner*—H. (Holly) T Le
(74) *Attorney, Agent, or Firm*—Birch, Stewart, Kolasch & Birch, LLP (57) ABSTRACT

A method for making the microporous carbon with modified pore size distribution and advanced sorption behavior. The carbon is derived from metal or metalloid carbides. The method employs the use of oxidant in reaction medium that during the carbide conversion into carbon widens small micropores, which otherwise would be hardly accessed by sorbing molecules or ions in practical applications. The microporous carbon obtained is free of impurities and possesses extremely narrow pore size distribution.

15 Claims, 5 Drawing Sheets

U.S. PATENT DOCUMENTS

| | | | |
|---|---|---|---|
| 6,024,899 A * | 2/2000 | Peng et al. | 264/29.1 |
| 6,579,833 B1 * | 6/2003 | McNallan et al. | 508/100 |
| 6,602,742 B2 * | 8/2003 | Maletin et al. | 438/142 |
| 6,697,249 B2 | 2/2004 | Maletin et al. | |
| 7,048,902 B2 * | 5/2006 | Gordeev et al. | 423/445 R |
| 2002/0097549 A1 | 7/2002 | Maletin et al. | |
| 2005/0058589 A1 * | 3/2005 | Lundquist et al. | 423/445 R |
| 2006/0239890 A1 * | 10/2006 | Chang et al. | 423/445 R |
| 2007/0275863 A1 * | 11/2007 | Whitmarsh | 508/123 |
| 2008/0207442 A1 * | 8/2008 | Pfeifer et al. | 502/416 |

FOREIGN PATENT DOCUMENTS

WO   WO-2004/094307 A1   11/2004

OTHER PUBLICATIONS

Gogotsi et al., Nature Materials, vol. 2, Sep. 2003, pp. 591-594.

* cited by examiner

METHOD OF MAKING THE POROUS CARBON MATERIAL OF DIFFERENT PORE SIZES AND POROUS CARBON MATERIALS PRODUCED BY THE METHOD

FIELD OF INVENTION

This invention relates to the synthesis of microporous carbon materials with the modified pore size distribution. It also relates to an improvement in the carbon synthesis procedure considering the halogenation of metal or metalloid carbides.

BACKGROUND OF THE INVENTION

Halogenation of mineral carbides, hereinafter carbides, has been used to produce microporous carbon materials with remarkably narrow pore size distribution as described in US20020097549. According to the international standards (IUPAC) the micropores are with the size of less than 20 Å (1 Å=0.1 nm). Pore size maximum of these materials may be as low as 6-7 Å. The carbide-derived microporous carbons are very attractive materials in several important application fields like gas and liquid purification from contaminating impurities, specially those having small-size atoms or molecules; storage of small-size molecules such as hydrogen and methane; desalination of drinking water such as method applying flow-throw capacitors; electric energy storing devices such as batteries and capacitors, etc.

Figure 1:
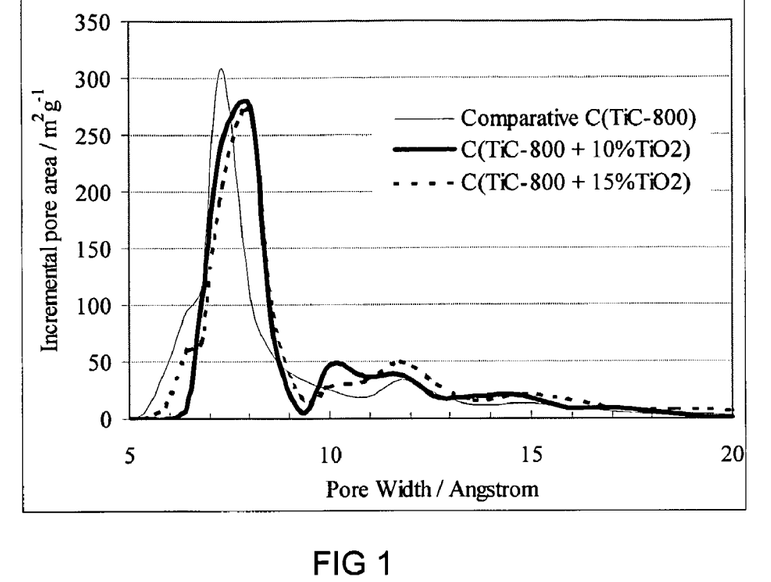
FIG. 1 shows the comparison of DFT pore size distributions of the carbide-derived microporous carbons according to an first embodiment of the invention and that known from the prior art.

The important issue within most of porous carbon applications is the quantity of pores with desired pore size in bulk volume of carbon. In fact the microporous carbide-derived carbon, usually made at temperature below 800-900° C., contains considerable amount of too small pores below 6-7 Å as shown in FIG. 1, which normally are not accessible in practical adsorption processes. The peak pore size is suggested to be adjusted within few angstroms by changing the carbide chlorination temperature [Gogotsi et al. Nature Mat., Vol. 2, p. 591 (2003)]. However, in practice the increased chlorination temperature reflects not only in the shift of the peak pore size but also in widening of the pore size distribution. The latter fact is usually undesired, while resulting in the lost molecular sieve behaviour of the carbide-derived carbon. Furthermore, the temperature initiated pore size shift not necessarily avoids formation of the inaccessible very small micropores. One can achieve substantial shift in the average pore size at reaction temperatures above 900-950° C., however, the high temperature values support the rearrangement of the carbon atoms into higher ordered nanostructures, thereby noticeably decreasing the quantity of micropores and the active surface in total volume of the carbon.

Prior art in PCT/EP03/04202 teaches how to enlarge the small micropores in highly microporous carbide-derived carbon by subsequently performed specific oxidation in very small micropores. However, when the carbon to be treated is too nanoporous and therefore difficult to saturate with the oxidising agent, the method is not effective enough or needs to be repeated several times. This results in the undesired resources consumption and increased cost of the final carbon material.

It is thus an object of this invention to provide a cheaper and more productive method for making the microporous carbon-derived carbon with improved access in micropores.

It is a further object of this invention to provide an improved carbon with a narrow pore size distribution.

SUMMARY OF THE INVENTION

The above objectives of the invention are achieved by modifying the long-known method of halogenation of the mineral carbides. More precisely, the process of extracting the element other than carbon from the crystal lattice of mineral carbide is modified so that etching of the carbide with halogen containing gas leaves a microporous carbon material with improved pore size distribution and advanced sorption properties.

This invention provides a method to particularly enlarge small micropores using in situ oxidation during the carbide halogenation process or controlling the temperatures during the carbide halogenation process. Invention regards to the modifying of the carbide halogenation process to improve the microporous structure of carbon produced during the process. General mass balance of carbon formation from carbides is described by the following equation:

$$M_yC + yz/2 X_2 \rightarrow C + y MX_z,$$

where subscripts are stoichiometrical constants, $X_2$ corresponds to a halogen, preferably chlorine, and M denotes the metal or metalloid. The bulk microporous structure is produced from most of the stoichiometric carbides at temperatures below 800-900° C. Above this temperature increases the tendency of forming the multi-layered nanographitic lamellas and sheets that creates the larger micro- and mesopores in carbon. Below 800-900° C. the microporous carbon with peak pore size of 7-8 Å is formed, which still contains considerable amount of pores less than 6-7 Å. Due to the high order of homogeneity these small micropores are hardly accessible to any sorbing molecules especially from liquid phase. Prior art describes enlarging of these pores with post oxidation of carbon. This invention describes the method that particularly avoids formation of inaccessible micropores during carbide conversion into microporous carbon.

The essence of invention is the oxidative or temperature enlargement of small micropores at surface layers of carbon particles that is in situ performed during the process of carbide conversion into the carbon. In the first embodiment of the invention the predetermined amount of the oxidising reagent is led into the contact with precursor carbide prior to the contact with halogen gas, whereby the oxidising reagent interacts with halogen releasing the oxygen that subsequently oxidises the carbon. Oxidation rate is controlled by the amount of oxidising reagent mixed with precursor carbide. In the second embodiment of the invention the method bases in the fact that the average size of the carbon pores depends on the temperature of the carbide halogenation. The depth and rate of the surface modification thereby is controlled by the thermal conditions of the carbide etching.

In a preferred embodiment the carbide or a mixture of different carbides, characterised by the formula $M_yC$, is chosen among those characterised by the stoichiometric constant $y<1.5$ and preferably among those characterised by the stoichiometric constant $y<1.1$. More specifically, the carbide-forming element M is preferably Titanium (Ti), Silicon (Si) or Aluminium (Al) or it denotes the mixture of different elements, preferably among Ti, Si, and Al. A general feature of carbides suitable for the present invention is that at temperatures below 800° C., they yield carbon with the relative content of micropores>95% and with dominating pore size below 9 Å.

The invention also relates to a microporous carbon material having comparatively larger pores in surface layers and narrower pores in the inner layers of the carbon particle; a density of compacted carbon powder of at least 0.6 g/cm³, a specific surface area of 1000-2200 m²/g and a relative specific surface area by pore size showing a maximum peak within the pore size range 7.5-20 Å according to the low-temperature nitrogen adsorption using density functional theory.

DESCRIPTION OF THE DRAWINGS

The present invention will be prescribed in more detail from the following description and examples of a not limiting the embodiment with reference to the attached drawings, wherein.

DESCRIPTION OF THE PREFERRED EMBODIMENTS

The bulk microporous carbon structure is produced from most of the stoichiometric mineral carbides at temperatures below 800-900° C. General mass balance of carbon formation from carbides is described by the following equation (Eq. 1):

where subscripts are stoichiometrical constants, $X_2$ corresponds to a halogen, preferably chlorine, and M denotes the metal or metalloid. Below 800-900° C. the microporous carbon with peak pore size of 7-8 Å is formed, which still contains considerable amount of pores less than 6-7 Å. Due to the high order of homogeneity considerable quantity of micropores are useless in such carbon materials. These small micropores are hardly accessible to any sorbing molecules especially from liquid phase. This invention provides a method to particularly enlarge small micropores using in situ oxidation during the carbide halogenation process or controlling the temperatures during the carbide halogenation process. Invention regards to the modifying of the carbide halogenation process to improve the microporous structure of carbon produced during the process. This invention describes the method that particularly avoids formation of inaccessible micropores during carbide conversion into microporous carbon.

The novelty of method is that during halogenation of the mineral carbide particles the carbon particles are formed, which have modified microporous structure. The essence of the modified pore structure is that the density of the outer layers of carbon particles is somewhat lower than the density in inner layers of carbon particles, with that improving the penetrability and access of micropores by sorbing substance (gaseous or liquids). The lower density of outer layers compared to the inner layers of carbon particle is achieved by applying the limited amount of the oxidizing reagent during carbon formation from the carbide or by applying for short predetermined period the reaction temperature T1 in initial stage of the carbide halogenation, whereby T1 is somewhat higher than the temperature T2 applied in subsequent halogenation of the carbide until desired rate of the carbide conversion into carbon is completed. It is possible to use the oxidizing agent and temperatures T1 and T2 in the same carbide halogenation process.

The carbon having modified micropore structure according to this invention is more effective adsorbent for the gas-storage, purification and specific extraction processes. These carbon materials are also more suitable than the carbon known from prior art for use in the energy storing devices. The improved characteristics regarding to the application in the energy storing devices include:

an increase of the specific capacitance of the carbon,
an increase of the deliverable energy density of the carbon.

In a preferred embodiment the carbide or a mixture of different carbides, characterised by the formula $M_yC$, is chosen among those characterised by the stoichiometric constant y<1.5 and preferably among those characterised by the stoichiometric constant y<1.1. More specifically, the carbide-forming element M is preferably Titanium (Ti), Silicon (Si) or Aluminium (Al) or it denotes the mixture of different elements, preferably among Ti, Si, and Al. A general feature of carbides suitable for the present invention is that at temperatures below 800° C., they yield carbon with the relative content of micropores>95% and with dominating pore size below 9 Å.

For example the mass balance of titanium carbide chlorination reaction is expressed by the following equation (Eq. 2):

The equation assumes that theoretically one mole of carbon could be produced from one mole of titanium carbide. In reality, the part of carbon is removed as carbon tetrachloride in secondary reaction, due to the excess of chlorine in reaction medium. The rate of the secondary reaction considerably depends on the temperature in reaction medium. In examples of the present invention approximately 14% loss of carbon is considered in chlorination of pure TiC at 800° C. In addition, the yield of the carbon depends between the 70-90% from the type of reactor, type of the raw material and from the terms of synthesis.

Figure 2:
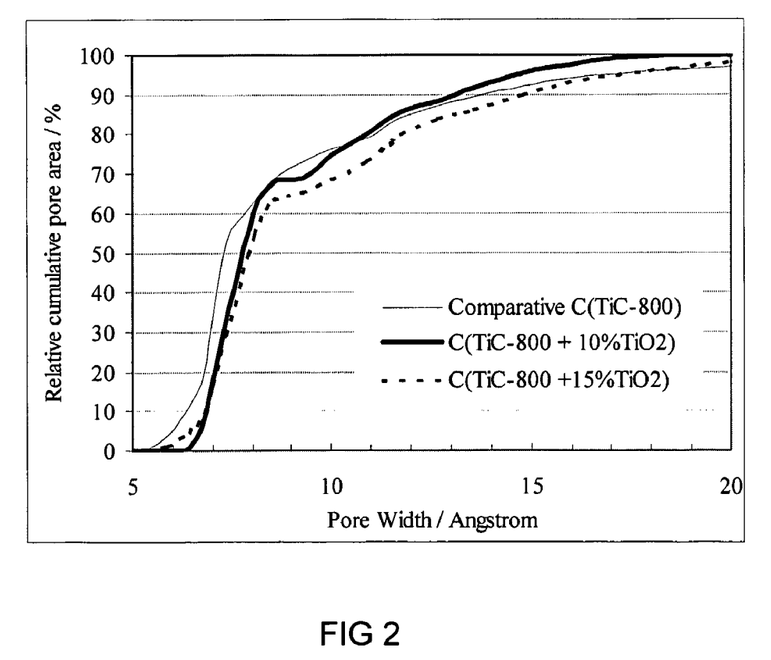
FIG. 2 shows the cumulative pore area plots of carbide-derived microporous carbons according to first embodiment of the invention and that known from the prior art.
Figure 4:
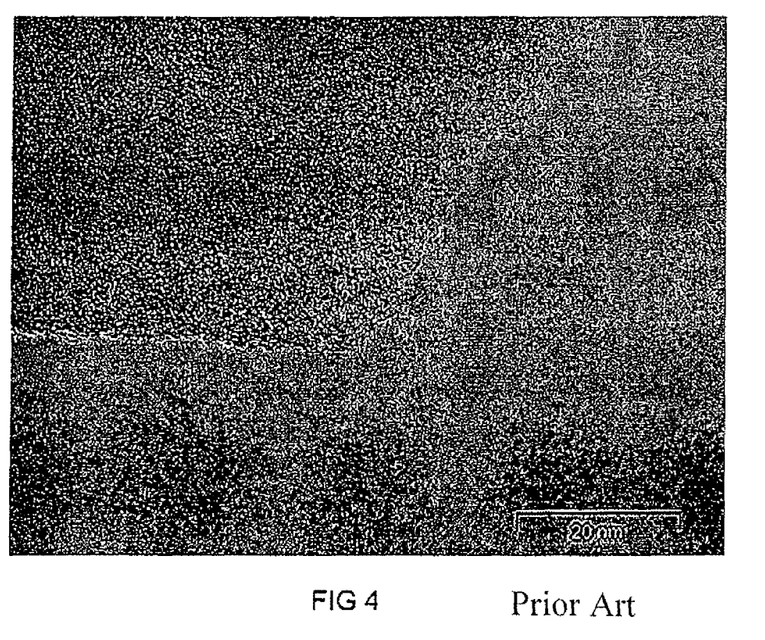
FIG. 4 shows HRTEM image of the material according to the prior art.

In prior art it is known that the carbon derived from TiC at 800° C. is almost completely amorphous microporous according X-ray diffraction and the high-resolution transmission electron microscopy studies. Characteristic HRTEM image is shown in FIG. 4. Such carbon possesses high BET surface area of approximately 1350 m² per gram and is almost completely microporous with a peak pore size of ~7 Å (FIG. 1). Up to 40% of surface area in this carbon material relates to the micropores, which size is less than 7 Å (FIG. 2). These very small pores are rather often useless in practical adsorption processes while being inaccessible to adsorbate molecules.

In the other hand, it is well known the method, also used as a part of so called Kroll process for Titanium production, which consists in passing chlorine over ilmenite or rutile, heated to redness with carbon. Respective overall reaction could be described by the following equation (Eq. 3):

According to this equation one mole of $TiO_2$ oxidizes one mole of carbon. Although the intermediate products in this process could be TiC, CO and $O_2$, finally the volatile $TiCl_4$ and $CO_2$ are formed in chlorine flow.

To minimize the formation of undesirably small micropores in carbon during carbide chlorination the present invention applies to combining the chlorination of carbide (Eq. 2) and in situ oxidation of carbon (Eq. 3) that is performed by mixing of oxide with precursor carbide and subsequently halogenizing this mixture. The following example describes the chlorination of the mixture of TiC and $TiO_2$ in stationary bed reactor at 800° C.

Figure 8:
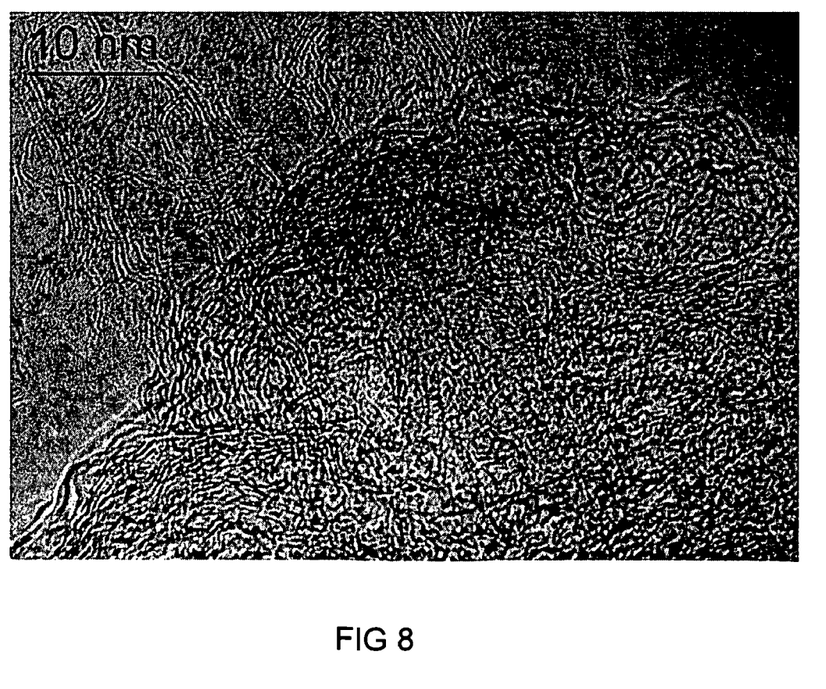
FIG. 8 shows HRTEM image of the microporous carbon formed at the temperature T1 of the synthesis.

In the other hand halogenation of TiC at the temperature 950-1000° C. there will be also formed prevailingly the microporous carbon. It is also known that with increasing the temperature increases tendency of forming of the ordered nanostructures such as graphitic sheets and lamellas and therefore the formed carbon has so-called transportation channels and the medium size of the pores shifts to the larger values. Characteristic HRTEM image is shown in FIG. 8.

To assure the admission to the small micropores the second embodiment of the present invention uses the step-by-step halogenation of the carbide. The halogenation will start at the temperature T1 according to the Eq. 2, wherein T1 is higher than it is necessary for forming a homogenous structure of the microporous carbon, and thereafter the halogenation will be continued at the temperature T2 to form a microporous carbon (for example chlorination of the TiC not over 800° C.).

Although the following examples are based in chlorination of the Titanium carbide for obtaining the microporous carbon the basic carbide can be any metal or metalloid carbide for example silicon carbide, aluminium carbide, molybdenum carbide or boron carbide. In a preferred embodiment the carbide or a mixture of different carbides, characterised by the formula $M_yC$, is chosen among those characterised by the stoichiometric constant y<1.5 and preferably among those characterised by the stoichiometric constant y<1.1. More specifically, the carbide-forming element M is preferably Titanium (Ti), Silicon (Si) or Aluminium (Al) or it denotes the mixture of different elements, preferably among Ti, Si, and Al.

EXAMPLE 1

According to the first embodiment of the invention the titanium carbide (H. C. Starck, grade C.A., 50 g) with an average particle size of 1.3-3 microns was thoroughly mixed with Titanium oxide powder (Kemira, 2.5 g). This mixture was thereafter loaded into a quartz stationary bed reactor and let to react with a flow of chlorine gas (99.999% assay) for 3 h at 800° C. Flow rate of chlorine gas was 1.5 l/min. The by-product, $TiCl_4$, was led away by the stream of the excess chlorine and passed through a water-cooled condenser into a collector. After that the reactor was flushed with Argon (0.5 l/min) at 1000° C. for 1 h to remove the excess of chlorine and residues of gaseous by-products from carbon. During heating and cooling, the reactor was flushed with a slow stream (0.5 l/min) of argon. Resulting carbon powder (9.6 g) was moved into quartz stationary bed reactor and treated with hydrogen gas at 800° C. for 3.5 h to dechlorinate deeply the carbon material and also to remove the oxygen containing functional groups from the surface of carbon. During heating and cooling, the reactor was flushed with a slow stream of Argon (0.3 l/min). Final yield of the carbon material was 8.5 g (85% of theoretical).

The rate of oxidation is controlled by the amount of oxide added to the precursor carbide. The overall yield of carbon is in good agreement with the mass balance in Eq. 2 as shown with the data in Table 1.

TABLE 1

The yield of the carbon

| Entry | $TiO_2$ [% wt. per TiC] | Theoretical yield of C [%]* | Experimental yield of C [%] |
| --- | --- | --- | --- |
| 1 | 5 | 82 | 85 |
| 2 | 10 | 79 | 80 |
| 3 | 15 | 75 | 75 |

*Theoretical yield is calculated considering the fact that the average yield of carbon derived from 1 mole of TiC with the absence of $TiO_2$ is 0.86 mole.

Porous structure of carbon materials produced by varying the precursor carbide, oxide content and chlorination temperature were characterized using different nitrogen and benzene sorption methods. Low temperature nitrogen sorption experiments were performed using Gemini Sorptometer 2375 (Micromeritics). The specific surface area of carbon materials was calculated according BET theory up to the nitrogen relative pressure ($P/P_0$) of 0.2. The total volume of pores was calculated from nitrogen adsorption at relative pressure ($P/P_0$) of 0.95. Pore size distribution was calculated from low-temperature nitrogen adsorption isotherm according to the Barrett-Joyner-Halenda (BJH) method and the method based on Density Functional Theory (DFT).

Adsorption dynamics of benzene vapours was studied at room temperature using computer controlled weighing of the carbon samples in benzene vapours at normal pressure and room temperature in time. The volume of pores that adsorbed benzene under the above-described conditions was calculated according to the equation:

$$W_s = (m_2 - m_1)/m_1 \times d_{C_6H_6} \tag{4}$$

where $m_1$ and $m_2$ are the initial and final weights of the test-sample, respectively, and $d_{C_6H_6}$ is the density of benzene at room temperature.

Specific surface ($S_{BET}$) according to BET, pore volume according to benzene ($W_s$) and nitrogen ($V_{tot}$) and incremental pore volume ($V_{d<11 Å}$) according to BJH method of carbon of the invention compared to the prior art are presented in Table 2.

TABLE 2

The specific characteristics of the carbon according to the invention

| Carbon | Carbide | T [° C.] | $TiO_2$ [%] | $W_s$ [cm³/g] | $S_{BET}$ [m²/g] | $V_{tot}$ [cm³/g] | $V_{d<11 Å}$ [cm³/g] | $V_{d>11 Å}$ [cm³/g] |
| --- | --- | --- | --- | --- | --- | --- | --- | --- |
| Comparison 1 | TiC | 800 | — | 0.59 | 1445 | 0.68 | 0.41 | 0.27 |
| Invention 1a | TiC | 800 | 5 | 0.60 | 1512 | 0.70 | 0.41 | 0.29 |
| Invention 1b | TiC | 800 | 10 | 0.66 | 1538 | 0.74 | 0.36 | 0.38 |
| Invention 1c | TiC | 800 | 15 | 0.74 | 1695 | 0.80 | 0.35 | 0.45 |

TABLE 2-continued

The specific characteristics of the carbon according to the invention

| Carbon | Carbide | T [° C.] | TiO$_2$ [%] | W$_s$ [cm$^3$/g] | S$_{BET}$ [m$^2$/g] | V$_{tot}$ [cm$^3$/g] | V$_{d<11 Å}$ [cm$^3$/g] | V$_{d>11 Å}$ [cm$^3$/g] |
|---|---|---|---|---|---|---|---|---|
| Comparison 2 | TiC | 700 | — | 0.54 | 1292 | 0.63 | 0.40 | 0.23 |
| Invention 2a | TiC | 700 | 10 | 0.62 | 1503 | 0.70 | 0.40 | 0.30 |
| Comparison 3 | SiC | 800 | — | 0.50 | 1209 | 0.59 | 0.36 | 0.23 |
| Invention 3a | SiC | 800 | 10 | 0.56 | 1347 | 0.67 | 0.36 | 0.31 |
| Invention 3b | SiC | 800 | 15 | 0.57 | 1389 | 0.69 | 0.35 | 0.34 |
| Comparison 4 | SiC | 900 | — | 0.49 | 1218 | 0.60 | 0.38 | 0.23 |
| Invention 4a | SiC | 900 | 10 | 0.50 | 1283 | 0.64 | 0.36 | 0.27 |

Figure 3:
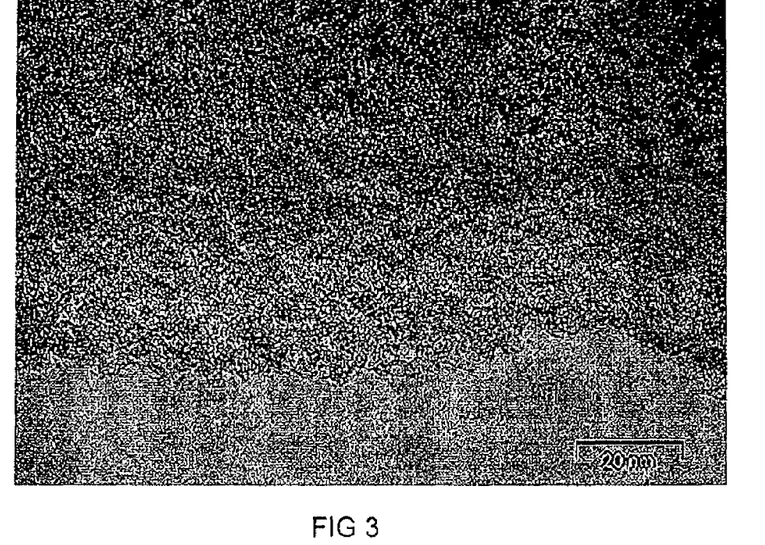
FIG. 3 shows HRTEM image of microporous carbon according to the first embodiment of the invention.

The pore size distribution presented in FIG. 1 and FIG. 2 according to the Density Functional theory confirms the modified microporous structure of carbon of this invention compared to that of the prior art. The effect of oxidation during chlorination is also obvious in HRTEM picture in FIG. 3. The bulk carbon of this invention is notably coarser compared to the material of prior art (FIG. 4).

EXAMPLE 2

According to the second embodiment of the invention the fluidized bed reactor was loaded with titanium carbide (Pacific Particulate Materials, 400 g) with an average particle size of ~70 μm and flowed with the Argon until the reaction temperature was achieved. Thereafter the carbide was let to react with a flow of chlorine gas (99.999% assay) for 15 min at 950° C. Flow rate of chlorine gas was 7 l/min. The by-product, TiCl$_4$, was led away by the stream of the excess chlorine and passed through a water-cooled condenser into a collector. After that the reactor was flushed with Argon (6 l/min) for 20 min and the temperature of reactor thereafter was decreased to 800° C. At 800° C., chlorination of the carbide was completed using chlorine flow of 7 l/min. Thereafter again the reactor was flowed with Argon (3 l/min) and flushed at 1000° C. 60 min. Resulting carbon powder (61 g) was moved into quartz stationary bed reactor and treated with hydrogen gas at 800° C. for 4 h to dechlorinate deeply the carbon material and also to remove the undesired functional groups from the surface of carbon. During heating and cooling, the reactor was flushed with a slow stream of Argon (0.3 l/min). Final yield of the carbon material (invention 7a) was 59 g (73.5% of theoretical).

The step-by-step chlorination procedure of TiC was also carried out in the rotary kiln reactor using the TiC powder with the fine particles (H. C. Starck, type CA, 1.3-3 μm) and the carbon materials (invention 5a and 6a) were compared with the carbon materials know in the prior art synthesised at discrete temperatures.

Specific surface (S$_{BET}$) according to BET, pore volume according to benzene (W$_s$) and nitrogen (V$_{tot}$) sorption and incremental pore volume (V$_{d<11 Å}$) according to BJH method of carbon of the invention compared to the prior art are presented in Tables 3 and 4.

TABLE 3

Carbon material characteristics when the method is carried out in the fluidized bed reactor

| Carbon | T1 ° C. | T2 ° C. | W$_s$ cm$^3$/g | S$_{BET}$ m$^2$/g | V$_{tot}$ cm$^3$/g | V$_{d<11 Å}$ cm$^3$/g | V$_{d>11 Å}$ cm$^3$/g |
|---|---|---|---|---|---|---|---|
| Comparison 5 | — | 700 | 0.54 | 1292 | 0.63 | 0.40 | 0.23 |
| Invention 5a | 950 | 700 | 0.66 | 1396 | 0.78 | 0.37 | 0.41 |
| Comparison 6 | — | 800 | 0.60 | 1348 | 0.67 | 0.37 | 0.30 |
| Invention 6a | 950 | 800 | 0.65 | 1474 | 0.74 | 0.39 | 0.35 |
| Comparison 6b | 950 | — | 0.67 | 1572 | 0.77 | 0.33 | 0.44 |

TABLE 4

Carbon material characteristics when the method is carried out in the rotary kiln reactor

| Carbon | T1 ° C. | T2 ° C. | W$_s$ cm$^3$/g | S$_{BET}$ m$^2$/g | V$_{tot}$ cm$^3$/g | V$_{d<11 Å}$ cm$^3$/g | V$_{d>11 Å}$ cm$^3$/g |
|---|---|---|---|---|---|---|---|
| Comparison 7 | — | 800 | 0.60 | 1473 | 0.67 | 0.36 | 0.31 |
| Invention 7a | 950 | 800 | 0.69 | 1582 | 0.73 | 0.34 | 0.39 |
| Comparison 7b | 950 | — | 0.61 | 1445 | 0.67 | 0.30 | 0.37 |

Figure 5:
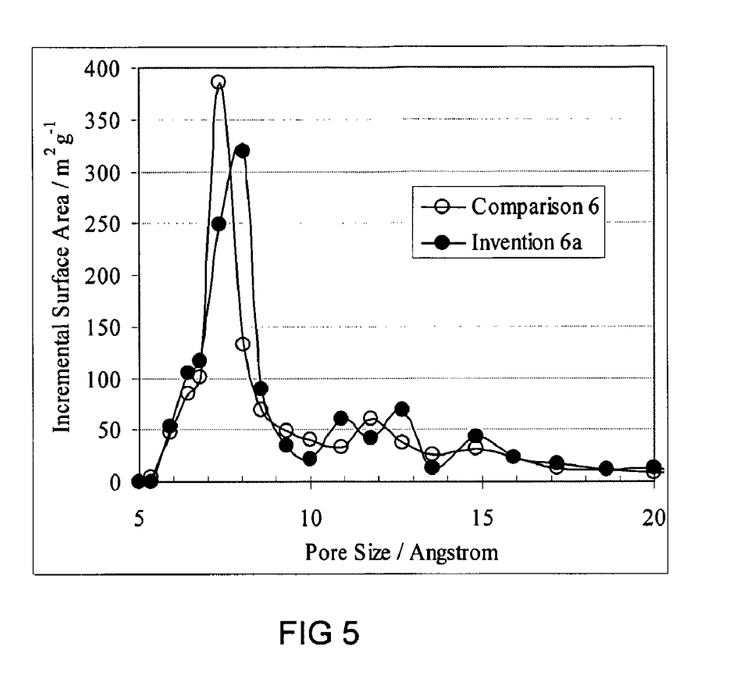
FIG. 5 shows the comparison of DFT pore size distributions of the carbide-derived microporous carbons according to the second embodiment of the invention and that known from the prior art.
Figure 6:
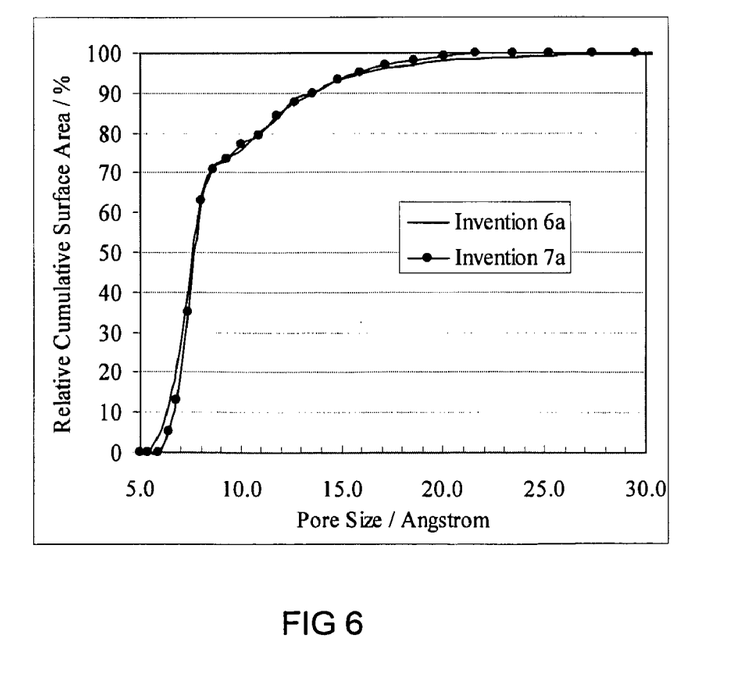
FIG. 6 shows the cumulative pore area plots of carbide-derived microporous carbons according to the second embodiment of the invention.
Figure 7:
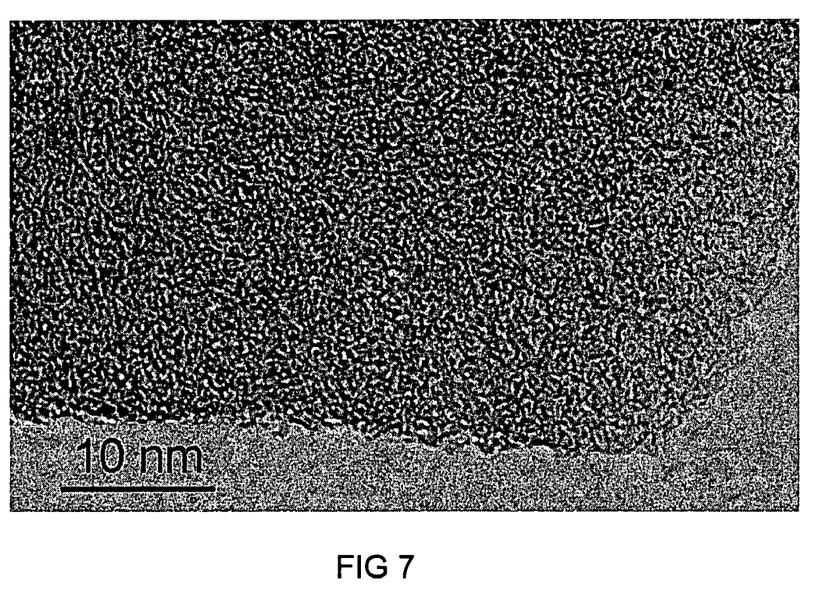
FIG. 7 shows HRTEM image of the microporous carbon formed at the temperature T2 of the synthesis.
Figure 9:
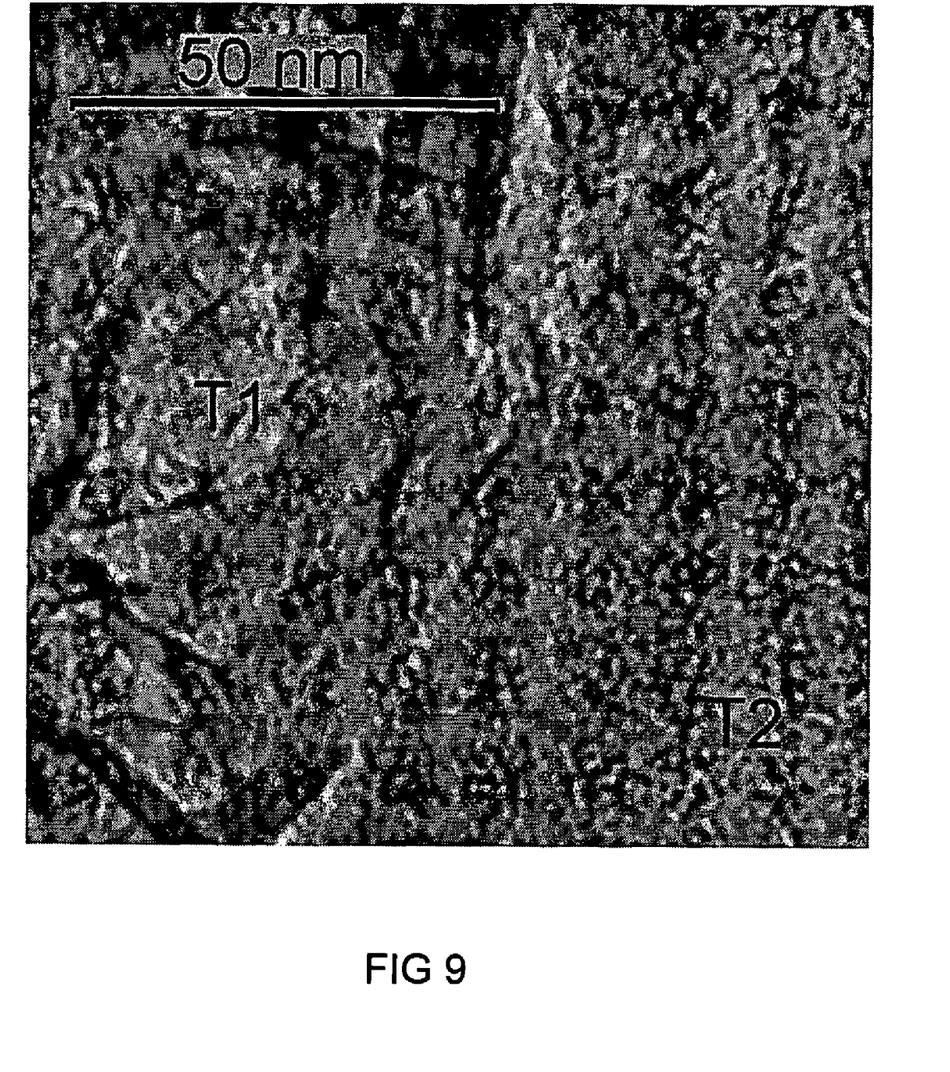
FIG. 9 shows the HRTEM image of the microporous carbon formed during step-by-step halogenation of the carbide at the temperatures T1 and T2.

The pore size distribution presented in FIG. 5 according to the Density Functional theory confirms the modified microporous structure of carbon of this invention compared to that of the prior art. The effect of step-by-step chlorination method using reaction temperatures T1 and T2 is also obvious in HRTEM picture in FIG. 9, which shows the areas of different density in carbon particle as a result of T1 and T2. Material of this invention is clearly different from that known from prior art (cf. FIG. 8).

The invention claimed is:
1. A method of making the microporous carbon material with a predetermined arrangement of pore-sizes in carbon particles comprising the dominating pore size of 7-8 Å inside the carbon particles and over 8 Å in surface layers of the carbon particles, wherein said method comprises:
   reacting a metal carbide or metalloid carbide with the halogen at temperature T required to convert the metal or metalloid carbide into carbon, wherein
   during halogenation of the metal carbide or metalloid carbide the temperature T of the reaction medium is modified so that a temperature T1 in the initial phase of the halogenation is higher than required for forming micropores;
   subsequently implementing further halogenation at a temperature T2, which is lower than temperature T1, but sufficient to convert the carbide into microporous carbon.

2. The method according to claim 1, wherein the metal carbide or metalloid carbide is selected from the group consisting of TiC, SiC, $Al_4C_3$, $Mo_2C$ and $B_4C$.

3. The method according to claim 2, wherein the metal carbide or metalloid carbide is TiC.

4. The method according to claim 1, wherein the temperature T of halogenation, which is used for producing the microporous carbon with a dominating pore size of 7-8 Å from the metal carbide or metalloid carbide is selected from the range of 500° C. to 1100° C.

5. The method according to claim 4, wherein the temperature T of halogenation is 800° C.

6. The method according to claim 1, wherein the temperature T1 of halogenation in the initial phase of the halogenation is selected from the range of 900° C. to 1100° C.

7. The method according to claim 6, wherein the temperature T1 of halogenation of the TiC is 950° C. to 1000° C.

8. The method according to claim 1, wherein the temperature T2 of halogenation implemented thereafter in the halogenation is selected from the range 500° C. to 900° C.

9. The method according to claim 1, wherein the temperature T2 of halogenation of the TiC is up to 800° C.

10. The method according to claim 1, wherein said halogen is provided in the form of chlorine gas.

11. The carbon material produced by the method prescribed in claim 1, wherein the specific surface area of the carbon material is at least 100 $m^2/g$ greater than specific surface area of the carbon material produced by halogenation of the same primary substance only in the temperature T2, whereas the specific surface area of the carbon material contains at least in extent of 90% the micropores with pore size below 20 Å, from which more than 70% is with the pore size of less than 10 Å.

12. The method according to claim 1, wherein the step of reacting a metal carbide or metalloid carbide with the halogen further comprises:
   providing a homogeneous mixture of the metal carbide or metalloid carbide with a solid oxidizing reagent, which decomposes to the volatile components during the carbide conversion into the carbon;
   reacting this homogeneous mixture with the halogen at temperature T required to convert the metal or metalloid carbide into carbon.

13. The method according to the claim 12, wherein the oxidizing reagent is metal oxide.

14. The method according to the claim 13, wherein the oxidizing reagent is $TiO_2$.

15. The method according to the claim 14, wherein the amount of the $TiO_2$ in the homogenous mixture is between 5 to 10% in weight relative to the carbide.

* * * * *